US011936119B2

(12) United States Patent
Shamblin

(10) Patent No.: US 11,936,119 B2
(45) Date of Patent: Mar. 19, 2024

(54) ISOLATED MAGNETIC DIPOLE ANTENNAS HAVING ANGLED EDGES FOR IMPROVED TUNING

(71) Applicant: Kyocera AVX Components (San Diego), Inc., San Diego, CA (US)

(72) Inventor: John Eric Shamblin, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 134 days.

(21) Appl. No.: 17/573,794

(22) Filed: Jan. 12, 2022

(65) Prior Publication Data

US 2022/0247072 A1 Aug. 4, 2022

Related U.S. Application Data

(60) Provisional application No. 63/143,164, filed on Jan. 29, 2021.

(51) Int. Cl.
*H01Q 3/26* (2006.01)
*H01Q 5/378* (2015.01)
*H01Q 25/04* (2006.01)

(52) U.S. Cl.
CPC ......... *H01Q 3/2611* (2013.01); *H01Q 3/2629* (2013.01); *H01Q 5/378* (2015.01); *H01Q 25/04* (2013.01)

(58) Field of Classification Search
CPC .... H01Q 3/2611; H01Q 3/2629; H01Q 5/378; H01Q 9/27
See application file for complete search history.

(56) References Cited

U.S. PATENT DOCUMENTS

| | | | | | |
|---|---|---|---|---|---|
| 4,506,267 | A * | 3/1985 | Harmuth | H01Q 17/001 343/846 |
| 6,339,402 | B1 * | 1/2002 | McKivergan | H01Q 1/243 343/702 |
| 6,456,243 | B1 | 9/2002 | Poilasne et al. | |
| 6,717,551 | B1 | 4/2004 | Desclos et al. | |
| 6,744,410 | B2 | 6/2004 | Shamblin et al. | |
| 6,943,730 | B2 | 9/2005 | Poilasne et al. | |
| 7,123,209 | B1 * | 10/2006 | Desclos | H01Q 21/30 343/860 |
| 7,663,556 | B2 | 2/2010 | Desclos et al. | |
| 7,696,932 | B2 | 4/2010 | Desclos et al. | |
| 2003/0137451 | A1 * | 7/2003 | Cheng | H01Q 19/32 343/834 |
| 2007/0120748 | A1 * | 5/2007 | Jenwatanavet | H01Q 1/243 343/702 |

(Continued)

FOREIGN PATENT DOCUMENTS

WO WO2003092118 11/2003

*Primary Examiner* — Dameon E Levi
*Assistant Examiner* — Leah Rosenberg
(74) *Attorney, Agent, or Firm* — Dority & Manning, P.A.

(57) ABSTRACT

An isolated magnetic dipole (IMD) antenna system can include an isolated magnetic dipole antenna radiating element including a body portion defining a body plane, the body portion comprising an isolated magnetic dipole element, and one or more angled edge portions disposed along at least one edge of the body portion, the one or more angled edge portions angularly offset with respect to the body plane.

16 Claims, 5 Drawing Sheets

(56) References Cited

U.S. PATENT DOCUMENTS

| | | | | |
|---|---|---|---|---|
| 2007/0216598 | A1* | 9/2007 | Fabrega-Sanchez .... | H01Q 7/00 343/866 |
| 2011/0012800 | A1* | 1/2011 | Shamblin ............. | H01Q 9/0442 343/746 |
| 2013/0088404 | A1* | 4/2013 | Ramachandran ........ | H01Q 7/00 343/861 |
| 2017/0016978 | A1* | 1/2017 | Hellsten ................... | H01Q 1/48 |
| 2020/0106195 | A1* | 4/2020 | Fleancu ................. | H01Q 21/26 |

* cited by examiner

ISOLATED MAGNETIC DIPOLE ANTENNAS HAVING ANGLED EDGES FOR IMPROVED TUNING

PRIORITY CLAIM

The present application claims the benefit of priority of U.S. Provisional App. No. 63/143,164, titled "Isolated Magnetic Dipole Antennas Having Angled Edges for Improved Tuning" and having a filing date of Jan. 29, 2021, which is incorporated by reference herein.

FIELD

Example aspects of the present disclosure relate generally to the field of antenna systems. More particularly, example aspects of the present disclosure relate to isolated magnetic dipole antennas having angled edges for improved tuning.

BACKGROUND

Active antennas can be used to facilitate communication between two remotely located devices. Active antennas can convert electrical signals into radio frequency (RF) waves that can be transmitted to another device. Active antennas can also convert RF waves into electrical signals for subsequent processing. In some instances, active antennas can be tuned by one or more tuning elements to alter a radiation pattern that is output by the antenna.

SUMMARY

Aspects and advantages of embodiments of the present disclosure will be set forth in part in the following description, or can be learned from the description, or can be learned through practice of the embodiments.

One example aspect of the present disclosure is directed to an antenna system. The antenna system can include an isolated magnetic dipole antenna radiating element including a body portion defining a body plane, the body portion comprising an isolated magnetic dipole element, and one or more angled edge portions disposed along at least one edge of the body portion, the one or more angled edge portions angularly offset with respect to the body plane.

Another example aspect is directed to an antenna system. The antenna system can include a ground plane. The antenna system can include an antenna radiating element. The antenna radiating element can include a body portion defining a body plane, the body portion parallel to and spaced apart from the ground plane, the body portion having a first side and a second side opposing the first side, the body portion being an isolated magnetic dipole element. The antenna radiating element can include a first angled edge portion disposed along the first side, the first angled edge portion defining a first angle with the body plane, and a second angled edge portion disposed along the second side, the second angled edge portion defining a second angle with the body plane.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1A:
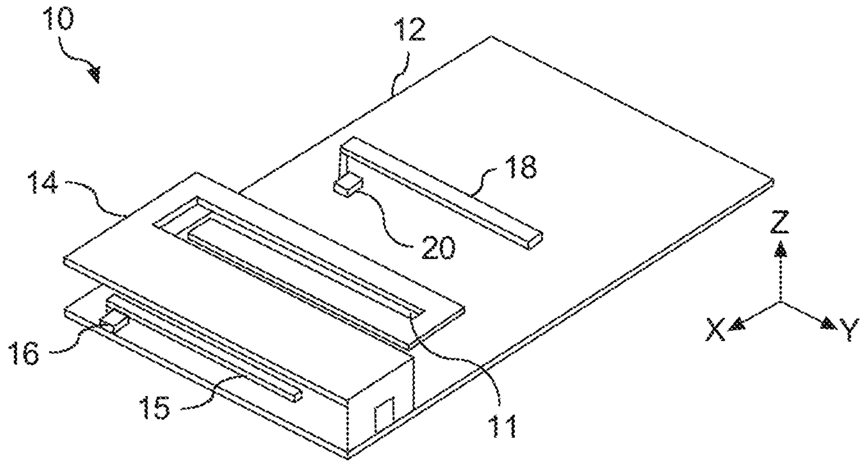
FIG. 1A illustrates an embodiment of a null steering antenna according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna system. The antenna system can include an isolated magnetic dipole (IMD) antenna including an isolated magnetic dipole antenna radiating element. In some implementations, the antenna system can be or can include a null-steering antenna further including a parasitic element positioned proximate to the antenna radiating element. Although example aspects of the present disclosure are discussed with reference to a null steering antenna, the example aspects discussed herein can be applicable to any suitable antenna system, such as, for example, a beam steering antenna, a modal antenna, a passive antenna (e.g., omitting the parasitic element), etc.

According to example aspects of the present disclosure, an antenna system can include an antenna radiating element, such as an isolated magnetic dipole (IMD) antenna radiating element. The antenna radiating element can be energized to receive and/or transmit wireless signals, such as radiofrequency (RF) signals. For instance, the antenna radiating element may be energized to provide for performing wireless communications. According to example aspects of the present disclosure, the antenna radiating element can include a body portion and one or more angled edge portions. The body portion can define a body plane, such as by being substantially planar. In some implementations, the body portion can be or can include an isolated magnetic dipole (IMD) element. For instance, in some implementations, the body portion can be or can include a spiral planar IMD element. In some implementations, an area of the body portion can be greater than an area of the one or more angled edge portions. Additionally and/or alternatively, a length (e.g., in a direction extending outward from a center of the body portion) of an angled edge portion can be less than a length and/or width of the body portion. For instance, the body portion may comprise a majority of the antenna radiating element. The body portion can be formed of any suitable material(s), such as conductive material(s). In some implementations, the angled edge portion(s) can be formed continuously with the body portion. For instance, in some implementations, the angled edge portion(s) and/or the body portion can be formed of a single sheet of material that is bent or otherwise deformed to form the angled edge portion(s).

The angled edge portion(s) can be disposed along at least one edge of the body portion. For instance, in some implementations, the one or more angled edge portions span an entire side of the body portion. For example, a width of an angled edge portion can be equivalent to a length of a respective edge along which the angled edge portion is disposed. Additionally and/or alternatively, the angled edge portion(s) can be angularly offset with respect to the body plane. For instance, in some implementations, the angled edge portion can be or can include one or more planar portions that define one or more edge planes. The one or more edge planes can intersect the body plane at an angle. For instance, in some implementations, the line of intersection between an edge plane and the body plane can be parallel to an edge of the body portion along which a respective angled edge portion is disposed. An angle between the edge plane(s) and the body plane can be between about 0 degrees and about 90 degrees. (e.g., with the body plane defining 0 degrees). The angled edge portion(s) can be formed of any suitable material(s), such as conductive material. In some implementations, the angled edge portion(s) can be disposed along an edge of the isolated magnetic dipole element. For instance, the angled edge portion(s) may be disposed along an edge of the body portion that is closest to a feature of the isolated magnetic dipole element, such as an airgap (e.g., a spiral airgap) or other suitable feature.

In some implementations, the antenna system can further include a ground plane. For instance, the ground plane may be grounded, such as coupled to any suitable ground (e.g., Earth ground). The ground plane may have a voltage of about zero volts with respect to Earth ground. The ground plane can be formed of any suitable material(s), such as conductive material. The body portion (e.g., the body plane) can be spaced apart from and/or parallel to the ground plane. For instance, the body portion and the ground plane can define a volume therebetween. In some implementations, the one or more angled edge portions can be directed toward the ground plane. For instance, a direction component of an edge plane of the angled edge portion(s) can be directed along a height of the antenna system in a direction approaching the ground plane. Additionally and/or alternatively, in some implementations, the one or more angled edge portions can be directed away from the ground plane. For instance, a direction component of an edge plane of the angled edge portion(s) can be directed along a height of the antenna system in a direction of increasing distance from the ground plane.

Antenna radiating elements according to example aspects of the present disclosure can include any suitable number of angled edge portions. For instance, in some implementations, an antenna radiating element can include a single angled edge portion. Additionally and/or alternatively, in some implementations, an antenna radiating element can include at least a first angled edge portion and a second angled edge portion. For instance, the body portion may have a first side and a second side, such as a second side that opposes the first side. The first angled edge portion may be disposed along the first side and/or the second edge portion may be disposed along the second side.

The first angled edge portion can define a first angle with the body plane. Additionally and/or alternatively, the second angled edge portion can define a second angle with the body plane. The first angle and the second angle may be about equivalent and/or different. For example, in some implementations, The first angle can be about equivalent to the second angle. Additionally and/or alternatively, in some implementations, the first angle can be greater than and/or less than the second angle. Additionally and/or alternatively, in some implementations, the first angled edge portion and the second angled edge portion may have the same and/or different directions. For instance, in some implementations, both the first angled edge portion and the second angled edge portion are directed toward or away from the ground plane. Additionally and/or alternatively, in some implementations, one of the first angled edge portion and the second angled edge portion can be directed toward the ground plane and the other of the first angled edge portion and/or the second angled edge portion can be directed away from the ground plane.

In some implementations, the antenna system can be an active antenna. For instance, the antenna system can include a parasitic element configured to provide a plurality of modes. Each mode of the plurality of modes can be associated with a different radiation pattern. The antenna system can further include at least one active tuning element coupled to the parasitic element. The at least one active tuning element can be configured to vary a reactance at the parasitic element to select a selected mode. The antenna system can further include a controller configured to vary the reactance to tune the antenna system in the selected mode of the plurality of modes.

As used herein, a "planar" or "substantially planar" portion or element can refer to an element having any suitable shape that generally resembles a plane or two-dimensional shape. For instance, a planar portion can have a thickness, such that a thickness and/or a height of the planar portion does not vary significantly along a planar direction (e.g., a direction defined by a lateral component and a transverse component) of the planar portion. For example, a thickness and/or a height of a planar portion can have less than an about 10% variation along the planar direction, such as less than an about 5% variation, such as less than an about 1% variation. Additionally and/or alternatively, a planar portion can define a length (e.g., in a lateral dimension) and/or a width (e.g., in a transverse dimension), such that a thickness and/or a height of the planar portion is substantially less than the length and/or width. For instance, a ratio of a width and/or a height of a planar portion to a thickness of the planar portion can be greater than about 1, such as greater than about 10, such as greater than about 50. In some embodiments, a thickness of a planar portion can be about equivalent at each point on a surface of the planar portion. As another example, a profile view of a planar portion can resemble one or more geometric shapes. For example, a profile view of a planar portion can resemble one or more rectangles, squares, ellipses, circles, triangles, or any other suitable geometric shapes. For example, a planar portion can have a square planar shape such that a top view of the planar portion resembles a square and a thickness of the planar portion has little to no variation.

The systems and methods according to example embodiments of the present disclosure provide a number of technical effects and benefits. For instance, the systems and methods according to example embodiments of the present disclosure can provide for improved tuning capabilities for an antenna system, such as a null steering antenna system. As one example, the angle between the angled edge portion and the body portion can be selected to provide improved tuning of the antenna system. This can provide improved connection strength between the antenna system and a communications participant. This can be particularly beneficial in improving communications capabilities of an isolated magnetic dipole (IMD) antenna.

With reference now to the Figures, example aspects of the present disclosure are discussed. As used herein, "about" in conjunction with a stated numerical value is intended to refer to within 20% of the stated numerical value.

FIG. 1A illustrates an example embodiment of an isolated magnetic dipole antenna 10 in accordance with aspects of the present disclosure. The isolated magnetic dipole antenna 10 can include a circuit board 12 (e.g., including a ground plane) and an (e.g., IMD) antenna radiating element 14 disposed on the circuit board 12. The antenna radiating element 14 can be an isolated magnetic dipole radiating element. For instance, the antenna radiating element 14 can include airgap 11 forming the isolated magnetic dipole element. An antenna volume can be defined between the circuit board (e.g., and the ground plane) and the radiating antenna element. A first parasitic element 15 can be positioned at least partially within the antenna volume. A first active tuning element 16 can be coupled with the parasitic element 15. The first active tuning element 16 can be a passive or active component or series of components and can be configured to alter a reactance on the first parasitic element 15 (e.g., by way of a variable reactance element, shorting to ground, etc.) resulting in a frequency shift of the antenna. In some embodiments, the first parasitic element 15 and/or the first active tuning element 16 can be omitted.

In some embodiments, a second parasitic element 18 can be disposed proximate the circuit board 12 and can be positioned outside of the antenna volume. The second parasitic element 18 can further include a second active tuning element 20 which can individually include one or more active and/or passive components configured to alter a reactance on the second parasitic element 18 (e.g., by way of a variable reactance element, shorting to ground, etc.) resulting in a frequency shift of the antenna. The second parasitic element 18 can be positioned adjacent the radiating element 14 and can also be positioned outside of the antenna volume. In some embodiments, the second parasitic element 18 and/or the second active tuning element 20 can be omitted.

In some implementations, an active antenna can be operable in a plurality of different modes. Each mode can be associated with a different radiation pattern and/or polarization state. For instance, electrical characteristics associated with the parasitic element can be controlled to adjust operating characteristics of the antenna system. As one example, the antenna system can include a controller that is configured to control electrical characteristics associated with the parasitic element to operate the null steering antenna in the plurality of different modes. For instance, the controller can configure the null steering antenna in a mode that provides a suitable communication quality (e.g., signal strength, noise ratio, etc.) with target(s) of the null steering antenna. As one example, the controller can control the beam direction and/or null direction of a radiation pattern, referred to as "beam steering" and/or "null steering." In some implementations, the null steering antenna can be tuned by selecting one of a plurality of reactance values of one or more reactive elements coupled to the parasitic element. For example, the controller may select between two to about four capacitors and/or inductors to be coupled to the parasitic element. The tuning circuit may sample each of the reactive elements and determine which of the capacitors and/or inductors provides a suitable (e.g., optimized, maximized, satisfying a threshold, etc.) communication quality. In some implementations, a variable reactance element can be coupled to the parasitic element. The variable reactance element can provide a variable reactance such that operating characteristics (e.g., null steering) of the antenna system can vary with the reactance of the variable reactance element.

The described configuration can provide an ability to shift the radiation pattern characteristics of the radiating antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 20 can include a switch for connecting the second parasitic to ground when "On" and for terminating the short when "Off". It should however be noted that a variable reactance on either of the first or second parasitic elements, for example by using a variable capacitor or other active tuning element, can further provide a variable shifting of the antenna pattern or the frequency response. For example, the first active tuning element 16 and/or second active tuning element 18 can include at least one of a varicap or varactor diode, tunable inductor, or switch.

Figure 1B:
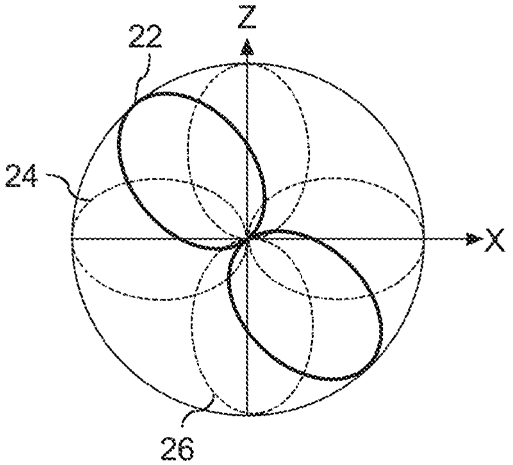
FIG. 1B illustrates a two-dimensional antenna radiation pattern associated with the null steering antenna of FIG. 1A.

FIG. 1B illustrates a two-dimensional antenna radiation pattern associated with the null steering antenna of FIG. 1A. The radiation pattern can be shifted by controlling an electrical characteristic associated with at least one of the first and second parasitic elements 16, 18 of the isolated magnetic dipole antenna 10. For example, in some embodiments, the radiation pattern can be shifted from a first mode 22 to a second mode 24, or a third mode 26.

Figure 1C:
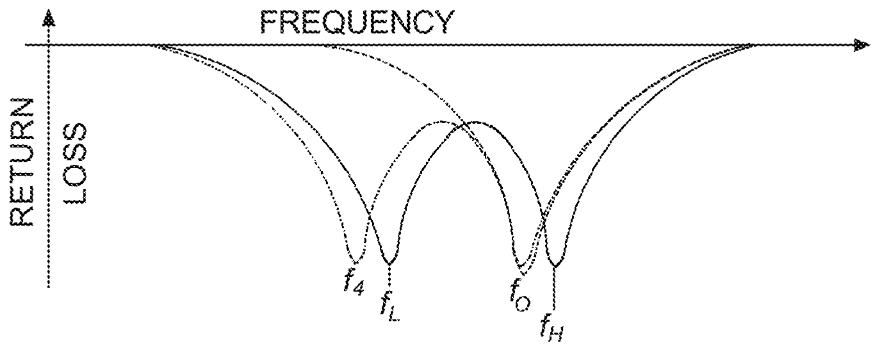
FIG. 1C illustrates an example frequency plot of the null steering antenna of FIG. 1A according to example embodiments of the present disclosure.

FIG. 1C illustrates an example frequency plot of the null steering antenna of FIG. 1A according to some aspects of the present disclosure. The frequency of the antenna can be shifted by controlling an electrical characteristic associated with at least one of the first or second parasitic elements 16, 18 of the isolated magnetic dipole antenna 10. For example, a first frequency ($f_0$) of the antenna can be achieved when one or both of the first and second parasitic elements are tuned by a first reactance value; the frequencies ($f_L$) and ($f_H$) can be produced when the second parasitic is shorted to ground; and the frequencies ($f_4$; $f_0$) can be produced when the first and second parasitic elements are each shorted to ground (e.g., have zero reactance). It should be understood that other configurations are possible within the scope of this disclosure. For example, more or fewer parasitic elements can be employed. The positioning and/or variable tuning of the parasitic elements can be altered to achieve additional modes that can exhibit different frequencies and/or combinations of frequencies.

FIGS. 1A-1C depict one example null steering antenna having a plurality of modes for purposes of illustration and discussion. Those of ordinary skill in the art, using the disclosures provided herein, will understand that other null steering antennas and/or antenna configurations can be used without deviating from the scope of the present disclosure. As used herein a "null steering antenna" refers to an antenna capable of operating in a plurality of modes where each mode is associated with a distinct radiation pattern.

Figure 2A:
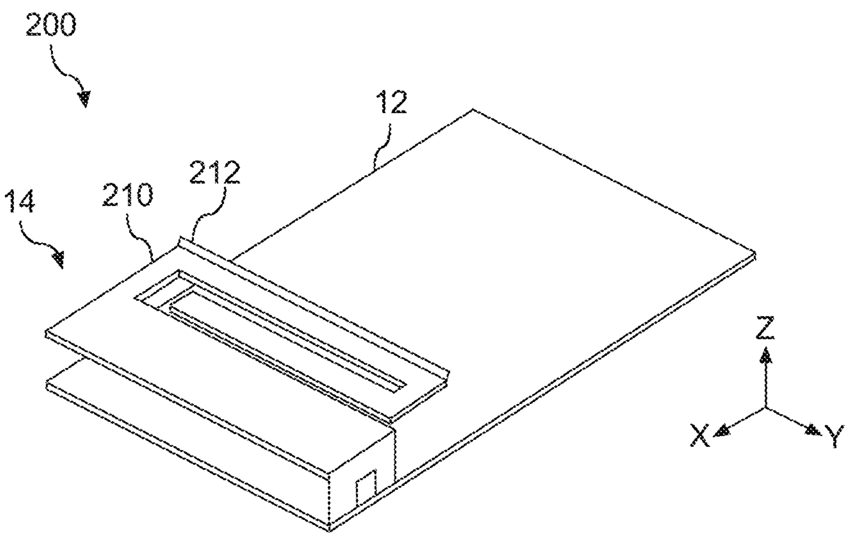
FIG. 2A illustrates a schematic diagram of an example antenna system according to example embodiments of the present disclosure.

FIG. 2A illustrates a schematic diagram of an example antenna system 200 according to example embodiments of the present disclosure. Antenna system 200 can include an antenna radiating element 14. The antenna radiating element 14 can be energized to receive and/or transmit wireless signals, such as radiofrequency (RF) signals. For instance, the antenna radiating element 14 may be energized to provide for performing wireless communications. According to example aspects of the present disclosure, the antenna radiating element 14 can include a body portion 210 and an angled edge portion 212. The body portion 210 can define a body plane 211 (FIG. 2B), such as by being substantially planar. In some implementations, the body portion 210 can be or can include an isolated magnetic dipole (IMD) element. For instance, in some implementations, the body portion 210 can be or can include a spiral planar IMD element. In some implementations, an area of the body portion 210 can be greater than an area of the angled edge portion 212. Additionally and/or alternatively, a length (e.g., in a direction extending outward from a center of the body portion 210) of an angled edge portion 212 can be less than a length and/or width of the body portion 210. For instance, the body portion 210 may comprise a majority of the antenna radiating element 14. The body portion 210 can be formed of any suitable material(s), such as conductive material(s). In some implementations, the angled edge portion 212 can be formed continuously with the body portion 210. For instance, in some implementations, the angled edge portion 212 and/or the body portion 210 can be formed of a single sheet of material that is bent or otherwise deformed to form the angled edge portion 212.

The angled edge portion 212 can be disposed along at least one edge of the body portion 210. For instance, in some implementations, the angled edge portion 212 span an entire side of the body portion 210. For example, a width of the angled edge portion 212 can be equivalent to a length of a respective edge along which the angled edge portion 212 is disposed.

Figure 2B:
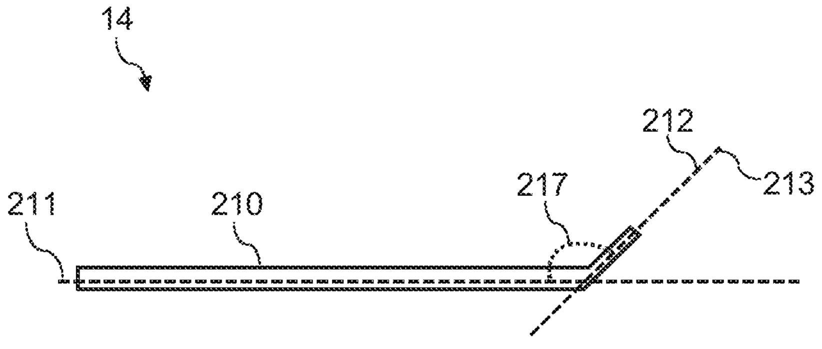
FIG. 2B illustrates a side view of an example antenna radiating element according to example embodiments of the present disclosure.

FIG. 2B illustrates a side view of an example antenna radiating element according to example embodiments of the present disclosure. As illustrated in FIG. 2B, the angled edge portion 212 can be angularly offset with respect to the body portion 210 (e.g., body plane 211). For instance, in some implementations, the angled edge portion 212 can define edge plane 213. The edge plane 213 can intersect the body plane 211 at an angle 217. For instance, in some implementations, the line of intersection between an edge plane 213 and the body plane 211 can be parallel to an edge of the body portion 210 along which a respective angled edge portion 212 is disposed. An angle 217 between the edge plane 213 and the body plane 211 can be between about 0 degrees and about 90 degrees (e.g., with the body plane 211 defining 0 degrees) in any suitable direction (e.g., away from ground plane 12). The angled edge portion 212 can be formed of any suitable material(s), such as conductive material.

Referring again to FIG. 2A, the antenna system 200 can further include a ground plane 12. For instance, the ground plane 12 may be grounded, such as coupled to any suitable ground (e.g., Earth ground). The ground plane 12 may have a voltage of about zero volts with respect to Earth ground. The ground plane 12 can be formed of any suitable material(s), such as conductive material. The body portion 210 (e.g., the body plane 211) can be spaced apart from and/or parallel to the ground plane 12. For instance, the body portion 210 and the ground plane 12 can define a volume therebetween. As illustrated in FIG. 2A, in some implementations, the angled edge portion 212 can be directed away from the ground plane 12. For instance, a direction component of an edge plane 213 of the angled edge portion 212 can be directed along a height of the antenna system 200 in a direction of increasing distance from the ground plane 12 (e.g., along the Y axis).

Figure 3A:
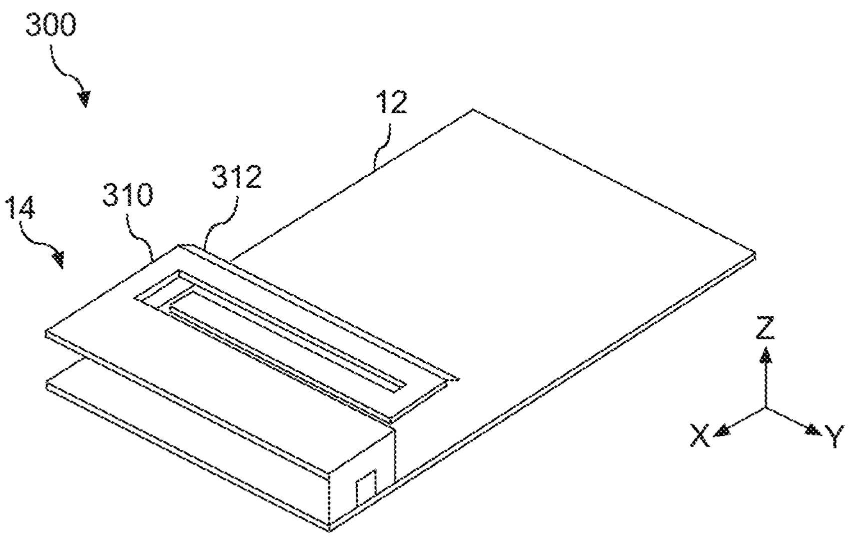
FIG. 3A illustrates a schematic diagram of an example antenna system according to example embodiments of the present disclosure.

FIG. 3A illustrates a schematic diagram of an example antenna system 300 according to example embodiments of the present disclosure. Antenna system 300 can include an antenna radiating element 14. The antenna radiating element 14 can be energized to receive and/or transmit wireless signals, such as radiofrequency (RF) signals. For instance, the antenna radiating element 14 may be energized to provide for performing wireless communications. According to example aspects of the present disclosure, the antenna radiating element 14 can include a body portion 310 and an angled edge portion 312. The body portion 310 can define a body plane 311 (FIG. 3B), such as by being substantially planar. In some implementations, the body portion 310 can be or can include an isolated magnetic dipole (IMD) element. For instance, in some implementations, the body portion 310 can be or can include a spiral planar IMD element. In some implementations, an area of the body portion 310 can be greater than an area of the angled edge portion 312. Additionally and/or alternatively, a length (e.g., in a direction extending outward from a center of the body portion 310) of an angled edge portion 312 can be less than a length and/or width of the body portion 310. For instance, the body portion 310 may comprise a majority of the antenna radiating element 14. The body portion 310 can be formed of any suitable material(s), such as conductive material(s). In some implementations, the angled edge portion 312 can be formed continuously with the body portion 310. For instance, in some implementations, the angled edge portion 312 and/or the body portion 310 can be formed of a single sheet of material that is bent or otherwise deformed to form the angled edge portion 312.

The angled edge portion 312 can be disposed along at least one edge of the body portion 310. For instance, in some implementations, the angled edge portion 312 span an entire side of the body portion 310. For example, a width of the angled edge portion 312 can be equivalent to a length of a respective edge along which the angled edge portion 312 is disposed.

Figure 3B:
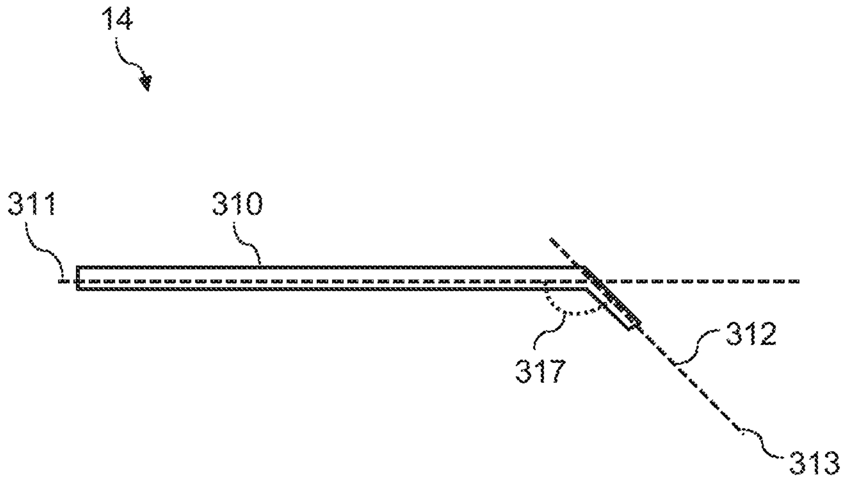
FIG. 3B illustrates a side view of an example antenna radiating element according to example embodiments of the present disclosure.

FIG. 3B illustrates a side view of an example antenna radiating element according to example embodiments of the present disclosure. As illustrated in FIG. 3B, the angled edge portion 312 can be angularly offset with respect to the body portion 310 (e.g., body plane 311). For instance, in some implementations, the angled edge portion 312 can define edge plane 313. The edge plane 313 can intersect the body plane 311 at an angle 317. For instance, in some implementations, the line of intersection between an edge plane 313 and the body plane 311 can be parallel to an edge of the body portion 310 along which a respective angled edge portion 312 is disposed. An angle 317 between the edge plane 313 and the body plane 311 can be between about 0 degrees and about 90 degrees (e.g., with the body plane 311 defining 0 degrees) in any suitable direction (e.g., toward ground plane 12). The angled edge portion 312 can be formed of any suitable material(s), such as conductive material.

Referring again to FIG. 3A, the antenna system 300 can further include a ground plane 12. For instance, the ground plane 12 may be grounded, such as coupled to any suitable ground (e.g., Earth ground). The ground plane 12 may have a voltage of about zero volts with respect to Earth ground. The ground plane 12 can be formed of any suitable material(s), such as conductive material. The body portion 310 (e.g., the body plane 311) can be spaced apart from and/or parallel to the ground plane 12. For instance, the body portion 310 and the ground plane 12 can define a volume therebetween. As illustrated in FIG. 3A, in some implementations, the angled edge portion 312 can be directed toward the ground plane 12. For instance, a direction component of an edge plane 313 of the angled edge portion 312 can be directed along a height of the antenna system 300 in a direction of decreasing distance from the ground plane 12 (e.g., along the Y axis).

Figure 4A:
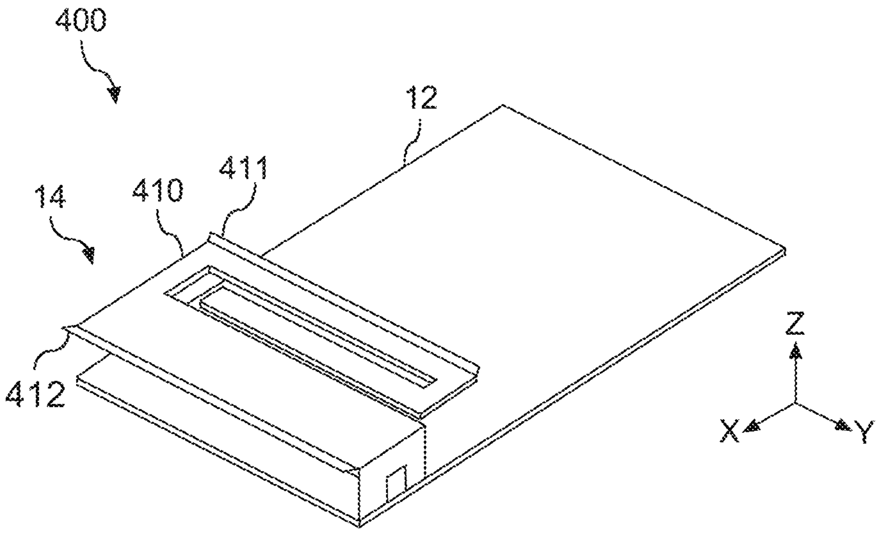
FIG. 4A illustrates a schematic diagram of an example antenna system according to example embodiments of the present disclosure.

FIG. 4A illustrates a schematic diagram of an example antenna system 400 according to example embodiments of the present disclosure. Antenna system 400 can include an antenna radiating element 14. The antenna radiating element 14 can be energized to receive and/or transmit wireless signals, such as radiofrequency (RF) signals. For instance, the antenna radiating element 14 may be energized to provide for performing wireless communications. According to example aspects of the present disclosure, the antenna radiating element 14 can include a body portion 410 and angled edge portions 412 and 414. The body portion 410 can define a body plane 411 (FIG. 4B), such as by being substantially planar. In some implementations, the body portion 410 can be or can include an isolated magnetic dipole (IMD) element. For instance, in some implementations, the body portion 410 can be or can include a spiral planar IMD element. In some implementations, an area of the body portion 410 can be greater than an area of the angled edge portions 412 and 414. Additionally and/or alternatively, a length (e.g., in a direction extending outward from a center of the body portion 410) of angled edge portions 412 and 414 can be less than a length and/or width of the body portion 410. For instance, the body portion 410 may comprise a majority of the antenna radiating element 14. The body portion 410 can be formed of any suitable material(s), such as conductive material(s). In some implementations, the angled edge portions 412 and 414 can be formed continuously with the body portion 410. For instance, in some implementations, the angled edge portions 412 and 414 and/or the body portion 410 can be formed of a single sheet of material that is bent or otherwise deformed to form the angled edge portions 412 and 414.

The angled edge portions 412 and 414 can be disposed along at least one edge of the body portion 410. For instance, in some implementations, the angled edge portions 412 and 414 span an entire side of the body portion 410. For example, a width of the angled edge portions 412 and 414 can be equivalent to a length of a respective edge along which the angled edge portions 412 and 414 are disposed.

The antenna system 400 can further include a ground plane 12. For instance, the ground plane 12 may be grounded, such as coupled to any suitable ground (e.g., Earth ground). The ground plane 12 may have a voltage of about zero volts with respect to Earth ground. The ground plane 12 can be formed of any suitable material(s), such as conductive material. The body portion 410 (e.g., the body plane 411) can be spaced apart from and/or parallel to the ground plane 12. For instance, the body portion 410 and the ground plane 12 can define a volume therebetween. In some implementations, the angled edge portions 412 and 414 can be directed toward the ground plane 12. For instance, a direction component of an edge plane 413 of the angled edge portions 412 and 414 can be directed along a height of the antenna system 400 in a direction approaching the ground plane 12 (e.g., along the Y axis). Additionally and/or alternatively, in some implementations, the angled edge portions 412 and 414 can be directed away from the ground plane 12. For instance, a direction component of an edge plane 413 of the angled edge portions 412 and 414 can be directed along a height of the antenna system 400 in a direction of increasing distance from the ground plane 12 (e.g., along the Y axis).

As depicted in FIG. 4A, antenna radiating element 400 can include at least a first angled edge portion 412 and a second angled edge portion 414. For instance, the body portion 410 may have a first side and a second side, such as a second side that opposes the first side. The first angled edge portion 412 may be disposed along the first side and/or the second edge portion 414 may be disposed along the second side.

Figure 4B:
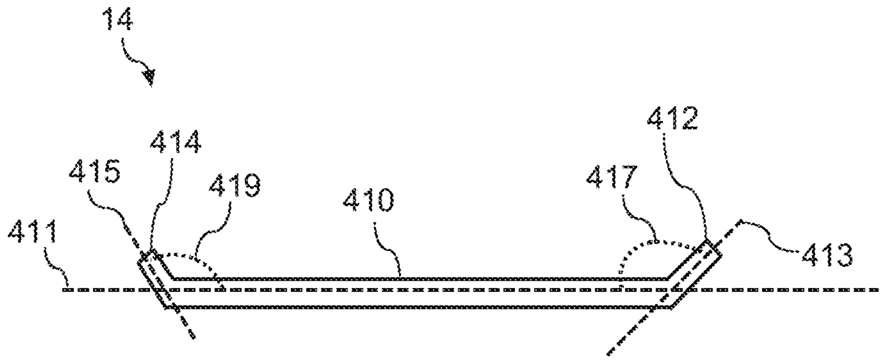
FIG. 4B illustrates a side view of an example antenna radiating element according to example embodiments of the present disclosure.

FIG. 4B illustrates a side view of an example antenna radiating element according to example embodiments of the present disclosure. As illustrated in FIG. 4B, the angled edge portions 412 and 414 can be angularly offset with respect to the body portion 410 (e.g., body plane 411). For instance, in some implementations, the angled edge portions 412 and 414 can define edge planes 413 and 415, respectively. The edge plane 413 can intersect the body plane 411 at a first angle 417. Additionally and/or alternatively, the edge plane 415 can intersect the body plane at a second angle 419. For instance, in some implementations, the line of intersection between an edge planes 413, 415 and the body plane 411 can be parallel to an edge of the body portion 410 along which a respective angled edge portions 412 or 414 is disposed. The first angle 417 and/or the second angle 419 can be between about 0 degrees and about 90 degrees. (e.g., with the body plane 411 defining 0 degrees). The angled edge portions 412 and 414 can be formed of any suitable material(s), such as conductive material.

In some implementations, the first angle 417 and the second angle 419 may be about equivalent and/or different. For example, in some implementations, The first angle 417 can be about equivalent to the second angle 419. Additionally and/or alternatively, in some implementations, the first angle 417 can be greater than and/or less than the second angle 419. Additionally and/or alternatively, in some implementations, the first angled edge portion 412 and the second angled edge portion 414 may have the same and/or different directions. For instance, in some implementations, and as illustrated in FIG. 4A, both the first angled edge portion 412 and the second angled edge portion 414 are directed toward or away from the ground plane 12. Additionally and/or alternatively, in some implementations, one of the first angled edge portion 412 and the second angled edge portion 414 can be directed toward the ground plane 12 and the other of the first angled edge portion 412 and/or the second angled edge portion 414 can be directed away from the ground plane 12.

Figure 5A:
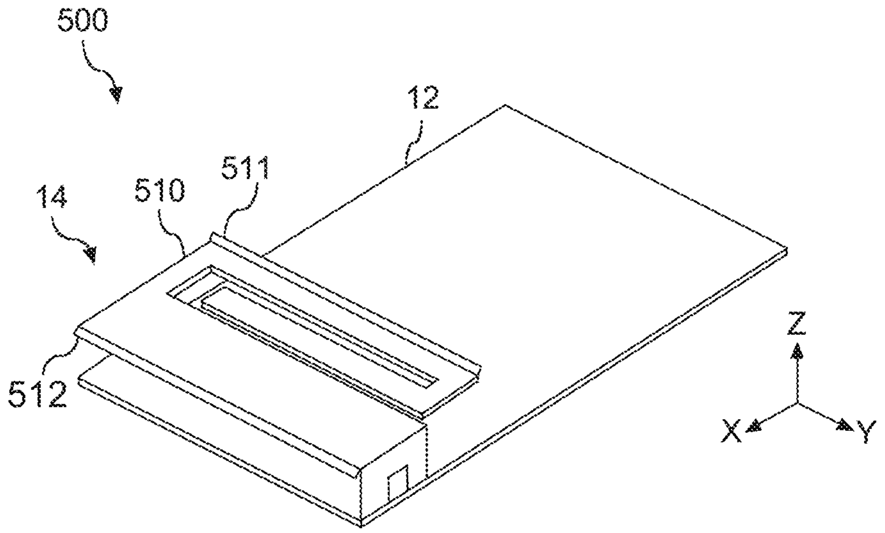
FIG. 5A illustrates a schematic diagram of an example antenna system according to example embodiments of the present disclosure.

FIG. 5A illustrates a schematic diagram of an example antenna system 500 according to example embodiments of the present disclosure. Antenna system 500 can include an antenna radiating element 14. The antenna radiating element 14 can be energized to receive and/or transmit wireless signals, such as radiofrequency (RF) signals. For instance, the antenna radiating element 14 may be energized to provide for performing wireless communications. According to example aspects of the present disclosure, the antenna radiating element 14 can include a body portion 510 and angled edge portions 512 and 514. The body portion 510 can define a body plane 511 (FIG. 5B), such as by being substantially planar. In some implementations, the body portion 510 can be or can include an isolated magnetic dipole (IMD) element. For instance, in some implementations, the body portion 510 can be or can include a spiral planar IMD element. In some implementations, an area of the body portion 510 can be greater than an area of the angled edge portions 512 and 514. Additionally and/or alternatively, a length (e.g., in a direction extending outward from a center of the body portion 510) of angled edge portions 512 and 514 can be less than a length and/or width of the body portion 510. For instance, the body portion 510 may comprise a majority of the antenna radiating element 14. The body portion 510 can be formed of any suitable material(s), such as conductive material(s). In some implementations, the angled edge portions 512 and 514 can be formed continuously with the body portion 510. For instance, in some implementations, the angled edge portions 512 and 514 and/or the body portion 510 can be formed of a single sheet of material that is bent or otherwise deformed to form the angled edge portions 512 and 514.

The angled edge portions 512 and 514 can be disposed along at least one edge of the body portion 510. For instance, in some implementations, the angled edge portions 512 and 514 span an entire side of the body portion 510. For example, a width of the angled edge portions 512 and 514 can be equivalent to a length of a respective edge along which the angled edge portions 512 and 514 are disposed.

The antenna system 500 can further include a ground plane 12. For instance, the ground plane 12 may be grounded, such as coupled to any suitable ground (e.g., Earth ground). The ground plane 12 may have a voltage of about zero volts with respect to Earth ground. The ground plane 12 can be formed of any suitable material(s), such as conductive material. The body portion 510 (e.g., the body plane 511) can be spaced apart from and/or parallel to the ground plane 12. For instance, the body portion 510 and the ground plane 12 can define a volume therebetween. In some implementations, the angled edge portions 512 and 514 can be directed toward the ground plane 12. For instance, a direction component of an edge plane 513 of the angled edge portions 512 and 514 can be directed along a height of the antenna system 500 in a direction approaching the ground plane 12 (e.g., along the Y axis). Additionally and/or alternatively, in some implementations, the angled edge portions 512 and 514 can be directed away from the ground plane 12. For instance, a direction component of an edge plane 513 of the angled edge portions 512 and 514 can be directed along a height of the antenna system 500 in a direction of increasing distance from the ground plane 12 (e.g., along the Y axis).

As depicted in FIG. 5A, antenna radiating element 500 can include at least a first angled edge portion 512 and a second angled edge portion 514. For instance, the body portion 510 may have a first side and a second side, such as a second side that opposes the first side. The first angled edge portion 512 may be disposed along the first side and/or the second edge portion 514 may be disposed along the second side.

Figure 5B:
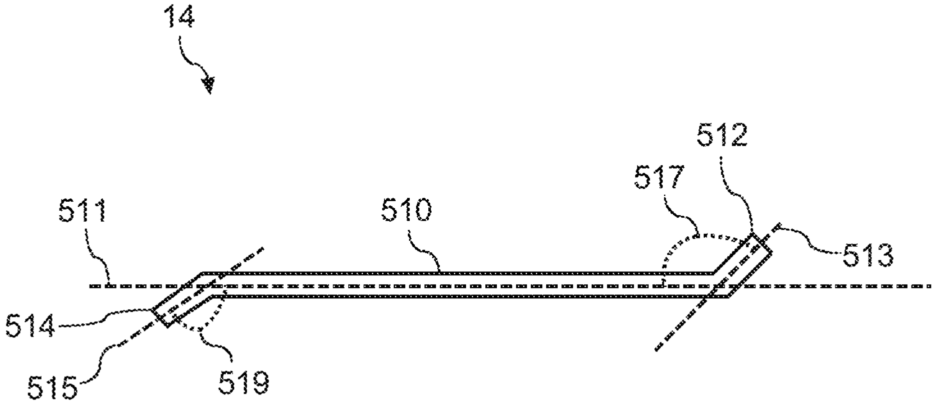
FIG. 5B illustrates a side view of an example antenna radiating element according to example embodiments of the present disclosure.

FIG. 5B illustrates a side view of an example antenna radiating element according to example embodiments of the present disclosure. As illustrated in FIG. 5B, the angled edge portions 512 and 514 can be angularly offset with respect to the body portion 510 (e.g., body plane 511). For instance, in some implementations, the angled edge portions 512 and 514 can define edge planes 513 and 515, respectively. The edge plane 513 can intersect the body plane 511 at a first angle 517. Additionally and/or alternatively, the edge plane 515 can intersect the body plane at a second angle 519. For instance, in some implementations, the line of intersection between an edge planes 513, 515 and the body plane 511 can be parallel to an edge of the body portion 510 along which a respective angled edge portions 512 or 514 is disposed. The first angle 517 and/or the second angle 519 can be between about 0 degrees and about 90 degrees. (e.g., with the body plane 511 defining 0 degrees). The angled edge portions 512 and 514 can be formed of any suitable material(s), such as conductive material.

In some implementations, the first angle 517 and the second angle 519 may be about equivalent and/or different. For example, in some implementations, The first angle 517 can be about equivalent to the second angle 519. Additionally and/or alternatively, in some implementations, the first angle 517 can be greater than and/or less than the second angle 519. Additionally and/or alternatively, in some implementations, the first angled edge portion 512 and the second angled edge portion 514 may have the same and/or different directions. For instance, in some implementations, both the first angled edge portion 512 and the second angled edge portion 514 are directed toward or away from the ground plane 12. Additionally and/or alternatively, in some implementations, and as illustrated in FIG. 5A, one of the first angled edge portion 512 and the second angled edge portion 514 can be directed toward the ground plane 12 and the other of the first angled edge portion 512 and/or the second angled edge portion 514 can be directed away from the ground plane 12.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system comprising:

an isolated magnetic dipole antenna radiating element comprising:

a body portion defining a body plane, the body portion comprising a spiral planar isolated magnetic dipole element; and one or more angled edge portions disposed along at least one longitudinal edge of the spiral planar isolated magnetic dipole element and extending away from an airgap in the spiral planar isolated magnetic dipole element, the one or more angled edge portions angularly offset with respect to the body plane.

2. The antenna system of claim 1, further comprising:

a parasitic element configured to provide a plurality of modes, each mode of the plurality of modes associated with a different radiation pattern;

at least one active tuning element coupled to the parasitic element, the at least one active tuning element configured to vary a reactance at the parasitic element to select a selected mode; and a controller configured to vary the reactance to tune the antenna system in the selected mode of the plurality of modes.

3. The antenna system of claim 1, wherein the body portion is substantially planar.

4. The antenna system of claim 1, wherein an area of the body portion is greater than an area of the one or more angled edge portions.

5. The antenna system of claim 1, wherein the one or more angled edge portions comprise one or more planar portions defining one or more edge planes.

6. The antenna system of claim 5, wherein an angle between the one or more edge planes and the body plane is between about 0 degrees and about 90 degrees.

7. The antenna system of claim 1, further comprising a ground plane.

8. The antenna system of claim 7, wherein the body plane is parallel to and spaced apart from the ground plane.

9. The antenna system of claim 7, wherein the one or more angled edge portions are directed toward the ground plane.

10. The antenna system of claim 7, wherein the one or more angled edge portions are directed away from the ground plane.

11. The antenna system of claim 1, wherein the one or more angled edge portions span an entire side of the body portion.

12. The antenna system of claim 1, wherein a length of the one or more angled edge portions is less than a length and/or width of the body portion.

13. The antenna system of claim 1, wherein the one or more angled edge portions are formed continuously with the body portion.

14. An antenna system comprising:

a ground plane; and an antenna radiating element comprising:

a body portion defining a body plane, the body portion parallel to and spaced apart from the ground plane, the body portion having a first side and a second side opposing the first side, the body portion comprising an isolated magnetic dipole element;

a first angled edge portion disposed along the first side, the first angled edge portion defining a first angle with the body plane; and a second angled edge portion disposed along the second side, the second angled edge portion defining a second angle with the body plane;

wherein one of the first angled edge portion and the second angled edge portion is directed toward the ground plane and the other of the first angled edge portion and the second angled edge portion is directed away from the ground plane.

15. The antenna system of claim 14, wherein the first angle is about equivalent to the second angle.

16. The antenna system of claim 14, wherein the first angle is greater than or less than the second angle.

* * * * *